May 22, 1923.
W. C. HAIGH
APPLIANCE FOR PLAYING FISHING GAMES
Filed Nov. 4, 1922
1,456,308
2 Sheets-Sheet 1
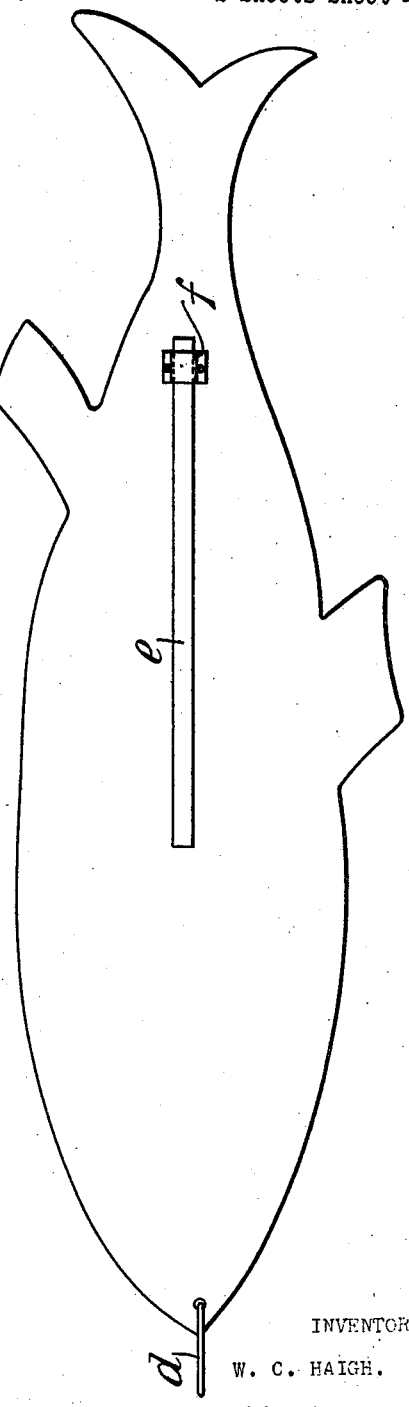
INVENTOR
W. C. HAIGH.
By his Attorneys, May 22, 1923.                                           1,456,308
W. C. HAIGH
APPLIANCE FOR PLAYING FISHING GAMES
Filed Nov. 4, 1922                          2 Sheets-Sheet 2
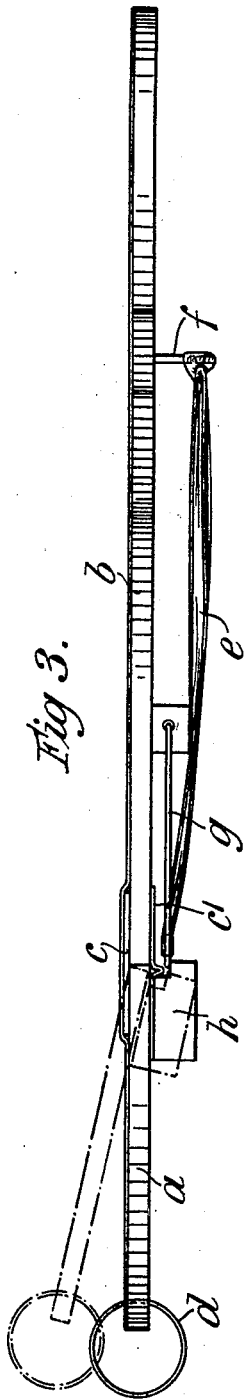
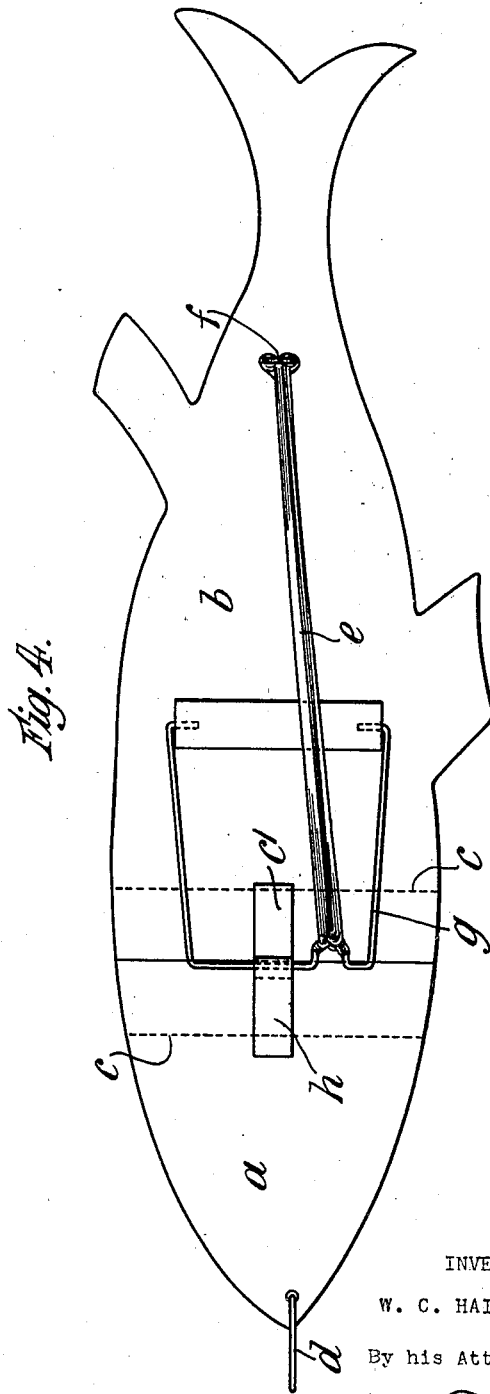
INVENTOR
W. C. HAIGH,
By his Attorneys Patented May 22, 1923.

1,456,308

UNITED STATES PATENT OFFICE.

WILLIAM CHANCELLOR HAIGH, OF PORTH, WALES.

APPLIANCE FOR PLAYING FISHING GAMES.

Application filed November 4, 1922. Serial No. 599,052.

*To all whom it may concern:*

Be it known that I, WILLIAM CHANCELLOR HAIGH, a subject of the King of Great Britain, residing at 71 Pontypridd Road, Porth, Glamorganshire, Wales, have invented a new and useful Improved Appliance for Playing Fishing Games, of which the following is a specification.

The object of this invention is to provide a device in fish form to be used in playing a fishing game which is so constructed that considerable skill is required to keep the device on the fishing hook when once engaging therewith.

In one form of the invention the appliance is made in the form or image of a fish having a device such as a ring in the mouth portion of the image adapted to be engaged by a fish hook and having attached to its under side a spring of such kind that when the image is placed on a support such as the inside of a box or table or a receptacle representing a pond the spring will be placed under tension by the weight of the image. When the image is hooked and raised suddenly and the weight of the image is withdrawn from the spring the resiliency of the spring will often cause the image to jump from the hook, but when slowly or carefully raised this tendency is overcome and the image remains on the hook.

In another form of the invention the image is made in two parts hinged together, one part having a device adapted to be engaged by a fish hook and the other part carrying a spring which is connected to one member of a catch carried by the same part of the image and which is adapted to engage another catch member carried by the other part of the image. When the catch members are engaged with each other the two members of the image are held together by the spring but when one part of the image is engaged by the fish hook the catch will be suddenly released when the image is lifted unless great care is used to prevent it. The sudden release of the catch often causes the image to jump from the hook, but if care is taken the image will be retained on the hook and deposited or withdrawn from the hook without unlocking the catch.

In the accompanying drawings:

Figure 1 is a side elevation of one form of the invention.

Figure 2 is a view of the under side thereof;

Figure 3 is a side elevation of another form of the invention, and

Figure 4 is a view of the underside thereof.

Figures 1 and 2 show a fish form or image which is preferably made of a single piece of wood. It has a device such as a ring $d$ adapted to engage the fish hook held on a line and which carries on its under side a doubly curved spring $e$, which is attached by means of a device $f$ to the under side of the image. When the image is placed on a support or in a receptacle representing a pond the weight of the image will compress the spring thus putting it under tension so that when the hook is engaged with the ring and the image is raised suddenly, the spring will suddenly expand and will often cause the image to jump from the hook, but if the image is raised slowly or carefully the image may be retained on the hook.

In Figures 3 and 4 a construction is shown in which the fish form or image is made in two parts $a$ and $b$ hinged together by strips of fabric $c$, $c'$, the latter piece of fabric $c'$ having a loop at the joint as shown. The strips $c$, $c'$ provide a suitable hinged joint which will permit one member of the image to turn or flex to a limited extent relatively to the other.

On the head part $a$ is a ring $d$ adapted to be engaged by a fish hook suspended from a line and on the body part $b$ is a spring $e$ such as a rubber band which is fixed at one end at $f$ to the rear part of the member $b$, its front end being connected with one member $g$ of a catch which is hinged to the body part $b$ in the manner shown. The part $a$ of the image carries the other member $h$ of the catch which is adapted to engage the member $g$ in the manner shown. When the two catch members are engaged as indicated by full lines in Figures 3 and 4, the spring $e$ is placed under tension and the members $a$ and $b$ are held in place as indicated. When, however, the ring $d$ is engaged by the fish hook and raised, unless great care is taken, the catch will be suddenly released and the image will jump from the hook. By slowly or carefully raising the image, it may be retained on the hook and removed therefrom when desired.

It will be understood that in playing the game a plurality of the fish images may be used, being arranged in a receptacle representing a pond or other container.

I claim as my invention:

1. An appliance for playing a fishing game comprising a fish form or image having at one end a device adapted to be engaged by a fish hook and provided with a spring which is under tension when the image is at rest in the pond and which tends to cause the image to jump from the hook when engaged with the hook and when first suddenly raised.

2. An appliance for playing a fishing game comprising a fish form or image having on one end a device adapted to be engaged by a fish hook and provided with a spring held under tension when the image is at rest in a pond and which tends to cause the image to jump from the hook when engaged therewith and when first suddenly raised and a catch on the image for holding the spring under tension.

3. An appliance for playing a fishing game, comprising a fish form or image made in two parts movable the one relatively to the other, one part being provided with a device adapted to be engaged by a fish hook and the other part carrying a spring which is held under tension but which is released when the image is engaged by the fish hook and suddenly raised, and a catch connecting the two parts of the image and which holds the spring under tension.

4. An appliance for playing a fishing game, comprising a fish form or image made in two parts hinged together, one part being provided with a device adapted to be engaged by a fish hook and with one member of a catch, and the other part carrying a spring and the other member of the catch, said catch serving to hold the spring under tension until the image is engaged by the fish hook and suddenly raised.

In testimony that I claim the foregoing as my invention I have signed my name this 24th day of October, 1922.

WILLIAM CHANCELLOR HAIGH.